United States Patent Office 2,938,890
Patented May 31, 1960

2,938,890
POLYETHYLENE PROCESS

Gaetano F. D'Alelio, South Bend, Ind., assignor, by mesne assignments, to W. R. Grace & Co., New York, N.Y., a corporation of Connecticut No Drawing. Filed Oct. 30, 1957, Ser. No. 693,233

6 Claims. (Cl. 260—94.9)

This invention relates to a novel synthesis of ethylene polymers.

More particularly, the invention involves making polyethylenes varying from oils to solids by subjecting ethylene in an inert solvent, whether or not under pressure, to the action of an activated chromium metal catalyst prepared in the presence or absence of ethylene by heating together chromium metal as wire, turnings, powder or the like with $TiCl_4$.

In general, the chromium-containing catalyst of this invention is prepared by treatment of Cr metal with $TiCl_4$ at any temperature between about 130° C. and the melting point of chromium (1900° C.) for a time sufficient at least to discolor the Cr surface.

It has been found that the nature of the catalyst largely determines the nature of the polyethylene polymer, i.e., whether the product contains any substantial amount of solid polymer. As a general rule, if any material amount of hydrocarbon-soluble chlorides (i.e., $CrCl_3$ and/or $TiCl_4$) is present in the reaction mixture along with the $TiCl_4$-treated chromium metal, the polymers resulting are oils of varying degrees of viscosity, and little or no solid polyethylene separates from the oil. Accordingly the nature of the polymer product will be determined largely by the presence or absence of $CrCl_3$ and/or $TiCl_4$ in, or adherent to, the metal catalyst, or in the reaction mixture. A preferred procedure for removing hydrocarbon soluble chlorides from the catalyst mass comprises one or more initial washes with a hydrocarbon known to form complexes with the hydrocarbon-soluble chlorides, e.g., benzene or toluene, followed by one or more washes with a non-complexing hydrocarbon, e.g., heptane, to remove any residual $CrCl_3$ and/or $TiCl_4$ hydrocarbon complex. However, this particular means of chloride removal is by no means critical, since several washes with non-complexing hydrocarbons will accomplish the same result. Also, the hydrocarbon-soluble chlorides may be removed by other means obvious to one skilled in the art, e.g., by heating the Cr-containing mass and subliming such chlorides from the catalyst in a stream of inert gas, such as nitrogen, argon, or the like.

The following examples will aid in explaining but do not limit the invention.

Example 1

An electrically-heated vetrical furnace made of a quartz tube 10 inches long and ¾ inch I.D., wrapped with electrical resistance wire was filled with Cr turnings (about 40 g.) and gradually heated to 400° C. It was maintained at this temperature for 12 hours while passing a vapor mixture of $TiCl_4$ in $N_2$ through the turnings. During this time substantial $CrCl_3$ formed on the metal. The metal was allowed to cool to room temperature in a stream of nitrogen. The Cr metal after this treatment was discolored.

In this example, the $TiCl_4$-$N_2$ vapor mixture was provided by bubbling dry $N_2$ through a flask of $TiCl_4$ at room temperature. The resultant mixture contained about 0.15 vol. percent of $TiCl_4$, and was passed into the furnace at the rate of about 10.8 cc. per minute.

In forming the catalyst, it is considered essential to discontinue the reaction of $TiCl_4$ with Cr before the Cr is completely consumed, so that the material formed will consist essentially of Cr with the reaction product of Cr with $TiCl_4$. The nature of this reaction product has not been definitely established, and in fact it appears to vary in composition depending on the conditions of reaction. Thus, the composition of such reaction product formed when Cr is boiled in $TiCl_4$ (at 136° C.) appears to be different from the composition of the product formed when Cr is heated at 200–500° C. with $TiCl_4$. In each case, however, it appears that some amount of a lower chloride of Ti is formed, i.e., $TiCl_2$ and/or $TiCl_3$, so that my experimental data are consistent with the theory that the catalyst comprises at least Cr plus $TiCl_2$ and/or $TiCl_3$, possibly with some by-product $CrCl_3$. However, I do not wish to be bound by any theory of operation; it suffices to say that when Cr is heated with $TiCl_4$ in the manner herein described, a highly active catalyst is formed that is capable of polymerizing ethylene.

Example 2

Twenty grams of Cr catalyst prepared by the procedure of Example 1 was washed with toluene, then again with heptane, to remove nearly all residual $CrCl_3$ and any other hydrocarbon-soluble chlorides, and then placed in a 200 ml.-capacity stainless steel rocking autoclave containing 50 ml. heptane. The autoclave was connected to a source of ethylene, sealed, and heated to the reaction temperature of 75° C. The ethylene pressure was initially 500 p.s.i.g., and from time to time over the reaction period of two days the autoclave was repressured to a range of 500–1500 p.s.i. of ethylene. At the end of the reaction the autoclave was cooled, vented, and the reaction mixture transferred to a beaker containing 200 ml. of methanol (acidified with a little HCl to dissolve metallic impurities) and boiled for 2 hours. A very good yield of purified solid polyethylene was then filtered and dried.

Example 3

The procedure of Example 1 was followed except that the furnace temperature was 300° C., and after reaction the system was cooled by continuing the stream of $TiCl_4$-$N_2$, whereby a small amount of $TiCl_4$ condensed on the catalyst.

Example 4

About 20 g. of catalyst prepared by the procedure of Example 3 was placed in 50 ml. of toluene and transferred to a 200 ml. stainless steel rocking autoclave, to which 1 ml. $TiCl_4$ was then added. The autoclave was charged with ethylene to 200 p.s.i., sealed, and heated to 150° C. under the autogenous pressure for 36 hours, after which it was cooled, vented, and opened. A good yield of viscous polyethylene oil was obtained.

Example 5

Ten grams of Cr (20 mesh) were refluxed in an inert atmosphere with 20 ml. of $TiCl_4$ for twelve hours and the surface of the chromium was coated and discolored, after which on cooling, there was added 150 ml. toluene and the reaction mixture was heated to 100° C. Ethylene was then bubbled slowly into the reaction mixture, with active stirring, for four hours. The reaction mixture was then diluted with methanol and about 5 grams of thick polyethylene oil isolated.

Example 6

Ten grams of chromium were refluxed with 5 ml. $TiCl_4$ for three hours, after which 100 ml. of toluene was added and ethylene introduced in the reaction mixture and processed as in Example 5. An oil was isolated as in Example 5 but it was more viscous than the polyethylene oil of that example.

In the ethylene polymerization step, the reaction temperature is suitably room temperature (about 20° C.) to 200–250° C., and the reaction pressure can range from atmospheric pressure to fairly high pressures, i.e., up to 10,000 p.s.i. and even higher. Obviously when it is desired to use a temperature higher than that of the boiling point of the inert solvent selected, the reaction must be carried out under super-atmospheric pressure. Ordinarily, pressures ranging from atmospheric pressure (or slightly higher, e.g., 5 p.s.i.g.) to about 500–1000 p.s.i.g. will give a good yield of product.

As a polymerization menstruum, substantially any inert material can be used which is liquid under the conditions of temperature and pressure employed and which has a solvent action on ethylene. These solvents are well-known to those skilled in the art. Hydrocarbon solvents are preferred, and are preferably substantially free of materials that react with lower chlorides of titanium, e.g., water, $CO_2$, $O_2$, and the like. Suitable solvents include pentane, hexane, heptane, cyclohexane, octane, benzene, xylene, toluene, and the like. The aromatic hydrocarbons are the preferred solvents.

The amount of catalyst is not critical. Relatively small amounts are operable to form relatively large amounts of polyethylene. In general, a practical range is 0.001–0.1 gram activated chromium per gram of ethylene polymerized. Even larger amounts of catalyst are operable, but present a purification problem as well as an economic problem.

*Example 7*

Two grams of Cr and 10 ml. $TiCl_4$ are refluxed for 48 hours under a $N_2$ atmosphere in a 100 ml. three-neck flask equipped with stirrer, reflux condenser and $N_2$ inlet. On cooling the catalyst is washed twice with 10 ml. portions of toluene. The catalyst mass, after the addition of 50 ml. of toluene to the flask, is transferred to a 200 cc. stainless steel bomb. After purging the bomb with $N_2$, the bomb is heated to about 100° C. and pressurized with ethylene to 500–1500 p.s.i. Repressurizing with ethylene is necessary throughout the polymerization period to maintain the aforementioned pressure range. After cooling and venting a yield of about 10 grams of crude solid polyethylene is obtained.

The following examples set forth alternate procedures for heating Cr with $TiCl_4$ to provide the activated Cr catalyst of this invention.

*Example 8*

Chromium turnings were crushed to provide finely divided material of a particle size such that most of it passed through a 20-mesh screen but was mostly retained on a 30-mesh screen. One part by weight of this material was placed in a vessel equipped with reflux condenser and containing about 10 parts by weight of $TiCl_4$. The mixture was boiled under reflux for two hours while passing nitrogen through the vessel so as to prevent pick-up of moisture from the atmosphere. The resultant mixture contains activated Cr metal catalyst, which can be recovered and used as such, or, if desired, the entire mixture can be used, including unreacted $TiCl_4$ and by-product chlorides, with results as herein described.

*Example 9*

A catalyst was prepared by passing $TiCl_4$ vapor for 6 hours through a glass tube packed with finely divided Cr maintained at a temperature of 125–250° C., e.g., about 140° C. The resultant material was allowed to cool under a stream of nitrogen, and was stored under slight nitrogen pressure.

*Example 10*

A length of chromium wire, 1/20 inch in diameter, was suspended as a spiral of several coils in a 500 ml. three-neck flask equipped with reflux condenser, nitrogen inlet, and sealed outlet for the two ends of the wire. The flask contained 125 ml. $TiCl_4$. The wire was positioned throughout its length so that none of the coils touched each other, so as to avoid electrical short circuits. The coils were completely submerged in the $TiCl_4$ liquid. The two ends were connected to a source of E.M.F. providing 25 volts delivered at 4 amperes, through a variac so that the wire was heated by resistance. As the wire warmed up, the $TiCl_4$ began to boil vigorously at the surface of the wire. The variac was adjusted to keep the return of $TiCl_4$ in the reflux condenser at a low but steady rate, and these conditions were maintained overnight (i.e., about 12 hours) under a nitrogen atmosphere. Thereafter the $TiCl_4$ remaining was decanted, and the flask with the treated wire still in position was washed with toluene, dried with warm nitrogen, and stored under a slight nitrogen pressure for use as a polyethylene catalyst by the process of this invention.

*Example 11*

Substantially the same materials and procedure were used as in Example 10, except that (a) only 15 ml. of $TiCl_4$ was used, (b) the wire was positioned so that none of it was immersed in the $TiCl_4$, nor exposed to liquid return from the reflux condenser, (c) the flask was heated externally to maintain the $TiCl_4$ boiling at a low rate, (d) the Cr wire was heated to about 400° C. in the resultant $TiCl_4$ vapor for about 10 minutes, and (e) the $TiCl_4$ was thereafter removed by boiling it out of the flask along with a stream of nitrogen.

The uses of the polyethylenes of this invention are analogous to the uses of those prepared by prior art procedures. The solid polyethylenes of this invention can be used to make moldings, film, filament, pipe, tubing, extruded articles, and the like, using the same equipment and techniques customary for solid polyethylenes of the prior art. The liquid polymers prepared by the process of this invention are useful as chemical intermediates for alkylation, epoxidation, and the like by procedures well known to those skilled in the art, as well as for plasticizers for the solid polymers produced by the procedures herein described, e.g., 1 part of the viscous oil produced in Example 4 can be thoroughly mixed with 10 parts of the solid polymer produced in Example 2 to give a product that is readily extruded into sheet in conventional sheet-extrusion apparatus.

I claim:

1. The method of preparing a normally solid polyethylene comprising subjecting ethylene at a temperature in the range of 20–250° C. at superatmospheric pressure in an inert solvent to the action of a catalyst formed by heating together, as the sole catalyst-forming reactants, Cr and $TiCl_4$ at a temperature of at least about 130° C., said catalyst reaction product consisting essentially of a mixture of chromium and chlorides of titanium and chromium, which mixture prior to use is washed substantially free of hydrocarbon-soluble chlorides with an inert hydrocarbon solvent.

2. The method according to claim 1 in which the temperature is 75–150° C. and in which the pressure is about 500–1500 p.s.i.

3. The method according to claim 1 in which the weight ratio of catalyst to ethylene polymerized is about 1:10–1000.

4. The method of making a catalyst reaction product consisting essentially of a mixture of chromium and chlorides of titanium and chromium that includes the steps of heating Cr with $TiCl_4$ as the sole catalyst forming reactants at a temperature of at least about 130° C. and washing substantially all hydrocarbon-soluble chlorides from the reaction product with an inert hydrocarbon solvent.

5. The method according to claim 4 in which the heating step is carried out by boiling Cr with $TiCl_4$ for about 12 hours.

6. The method according to claim 4 in which the heating step is carried out by subjecting Cr to $TiCl_4$ vapor at 200–500° C.

References Cited in the file of this patent

FOREIGN PATENTS

| | | |
|---|---|---|
| 874,215 | Germany | Apr. 20, 1953 |
| 534,792 | Belgium | Jan. 31, 1955 |
| 538,782 | Belgium | Dec. 6, 1955 |